United States Patent [19]

Fujii et al.

[11] 4,261,880

[45] Apr. 14, 1981

[54] POLYOLEFIN RESIN COMPOSITIONS

[75] Inventors: Masaki Fujii, Yokkaichi; Akiyoshi Onishi, Tsu, both of Japan

[73] Assignee: Mitsubishi Petrochemical Co., Ltd., Tokyo, Japan

[21] Appl. No.: 963,346

[22] Filed: Nov. 24, 1978

[30] Foreign Application Priority Data

Nov. 25, 1977 [JP] Japan .................. 52-141235

[51] Int. Cl.$^3$ .......................... C08K 5/49; C08K 5/52
[52] U.S. Cl. .................. 260/45.8 NT; 260/45.7 PH; 260/45.7 PS; 260/45.8 NW; 260/45.8 R; 260/45.95 F; 260/45.95 L; 260/45.95 R; 526/125
[58] Field of Search ............... 260/45.7 PH, 45.8 NT, 260/930; 526/125 (U.S. only); 525/2 (U.S. only)

[56] References Cited

U.S. PATENT DOCUMENTS

| | | | |
|---|---|---|---|
| 3,013,003 | 12/1961 | Maragliano et al. | 260/45.7 PH |
| 3,039,993 | 6/1962 | Friedman | 260/45.7 PH |
| 3,119,783 | 1/1964 | Baum | 260/45.7 PH |
| 3,188,298 | 6/1965 | Williamson et al. | 260/45.7 PH |
| 3,244,667 | 4/1966 | Burgess | 260/45.8 NT |
| 3,256,237 | 6/1966 | Casey | 260/45.8 A |
| 3,322,718 | 5/1967 | Jacob | 260/45.8 NT |
| 3,405,089 | 10/1968 | Mauz et al. | 260/45.8 NT |
| 3,476,699 | 11/1969 | Kauder et al. | 260/930 |
| 3,830,787 | 8/1974 | Susa et al. | 526/125 |
| 3,962,203 | 6/1976 | Karayannis et al. | 528/486 |
| 4,120,820 | 10/1978 | Birkelbach | 526/125 |
| 4,130,503 | 12/1978 | Fodor | 526/125 |
| 4,184,987 | 1/1980 | Karayannis et al. | 260/45.7 PH |

FOREIGN PATENT DOCUMENTS 52-32985 3/1977 Japan .
1146379 3/1969 United Kingdom .

OTHER PUBLICATIONS

Murahashi et al., Plastics Handbook (Japan), 1964, pp. 183–185.
Kambara et al., Handbook of Additives for Plastics and Rubbers (Japan), 1970, pp. 566–571.

*Primary Examiner*—Hosea E. Taylor
*Assistant Examiner*—R. A. White
*Attorney, Agent, or Firm*—Robert E. Burns; Emmanuel J. Lobato; Bruce L. Adams

[57] ABSTRACT

Improvement in the weathering properties of polyolefin resins has been achieved by intimate compositions comprising Ziegler-process crystalline polyolefins containing halogen-magnesium compounds as catalytic carrier residues, and organic phosphorus compounds such as organic phosphites. The compositions may contain auxiliary components normally used in polyolefin resins; antioxidants and/or ultraviolet absorbers are especially useful.

16 Claims, No Drawings

POLYOLEFIN RESIN COMPOSITIONS

BACKGROUND OF THE INVENTION

1. Field of the Invention

This invention relates to crystalline polyolefin resin compositions comprising specific crystalline polyolefins and specific organic phosphorus compounds, said polyolefin resin being produced in the presence of a Ziegler type complex catalyst, namely a Ziegler catalyst, a Ziegler-Natta catalyst or any modification thereof, supported on a halogen-containing magnesium compound such as magnesium chloride and not subjected to a catalyst residue-removal step. More particularly, this invention relates to novel crystalline polyolefin resin compositions in which the weathering properties of such polyolefin resins with catalyst residue unremoved have been improved.

2. Description of the Prior Art

When a Ziegler type complex catalyst supported on a halogen-containing magnesium compound is used, the yield of polymer per a given amount of a transition metal which is the main component of the catalyst (such as titanium) is several hundreds to tens of hundreds times as much as the yield obtained when an unsupported catalyst is used such as the catalyst system comprising diethylaluminium monochloride and an activated titanium trichloride-aluminium chloride mixture which has been prepared by reducing titanium tetrachloride with metallic aluminium and milling the reaction product. Moreover, a high-crystalline polymer can be obtained by using the supported catalyst. Thus, the above-mentioned catalysts have been noted as novel catalysts which do not need removal of the catalyst residues or extraction of the amorphous polymer from the resulting polyolefin resins. Typical examples of such novel catalysts are disclosed in Japanese Laid-Open Patent Publication Nos. 9342/1972 and 126590/1975 Specifications.

Such supported catalysts provide higher polymer yield per amount of a transition metal which is the main component of the catalyst, but the concentration of the transition metal supported on the given amount of carriers is low. Thus, there arise the adverse effects of the remaining carriers on the polyolefin resins with the catalyst residue unremoved. In other words, the amount of a transition metal component supported on the carrier is from less than 1% to 10% at the most by weight of the solid catalyst component. The yield of polymer per the carrier (magnesium compound) is from several thousands to tens of thousands at the most. Thus, the thermal stability, odor, color, anticorrosivity, weathering property and other properties of the molded polymer products may be impaired by the magnesium compounds (usually magnesium halides) contained in the polymers which have not been subjected to a catalyst residue-removal step. It has been especially important to solve the problem of low weatherability, since large quantities of molded polyolefin resin products are used outdoors.

SUMMARY OF THE INVENTION

An object of the present invention is to provide novel polyolefin resin compositions improved in the weathering properties whereby the above-mentioned problems are solved. This object is achieved by a polyolefin composition which has been homogeneously incorporated with a specific organic phosphorus compound.

In accordance with the present invention, there is provided a polyolefin resin composition improved in weathering properties comprising the following two components (1) and (2) in an intimate admixture:

(1) a crystalline polyolefin resin which has been produced in the presence of a Ziegler type complex catalyst supported on a halogen-containing magnesium compound and has not yet been subjected to a catalyst residue-removal step; and (2) an organic phosphorus compound in a quantity of from 0.1 to 1,000 times the weight of the halogen-containing magnesium compound contained in the crystalline polyolefin resin, the organic phosphorus compound being selected from the group consisting of:

(i) a compound of the formula $(R^1O)_3P$, wherein $R^1$ is hydrogen, an alkyl group having from 1 to 20 carbon atoms, an aryl or alkaryl group having from 6 to 20 carbon atoms, an aralkyl group having from 7 to 30 carbon atoms, or hydroxy or halo-, alkylthio-substituted derivatives thereof wherein, the alkyl moiety has 1 to 30 carbon atoms, and the three $R^1$ groups may be the same or different;

(ii) a compound of the formula, $(R^2O)_2P$-O-L-O-$P(OR^2)_2$, wherein $R^2$ has the same definition as the above-mentioned $R^1$, the four $R^2$s being the same or different, and L is a divalent hydrocarbon residue having from 2 to 30 carbon atoms with or without an ether linkage contained therein;

(iii) a compound of the formula

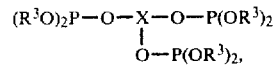

wherein $R^3$ has the same definition as the above-mentioned $R^1$, the six $R^3$s being the same or different, and X is a trivalent hydrocarbon residue having from 3 to 40 carbon atoms with or without an ether linkage contained therein;

(iv) a compound of the formula

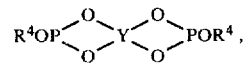

wherein $R^4$ has the same definition as the above-mentioned $R^1$, the two $R^4$s being the same or different, and Y is a tetravalent hydrocarbon residue having from 5 to 20 carbon atoms with or without an ether linkage contained therein;

(v) a compound of the formula $(R^5S)_3P$, wherein $R^5$ has the same definition as the above-mentioned $R^1$, the three $R^5$s being the same or different; and (vi) mixtures thereof.

As mentioned above, the effect achieved by the present invention is based on our discoveries of the specific behavior of the organic phosphorus compounds toward the halogen-containing magnesium compound which has been used as the carrier for the transition metal component of Ziegler type complex catalyst and remains in the resulting polyolefin resin.

DETAILED EXPLANATION OF THE INVENTION

1. Polyolefin Resins to be Used

The crystalline polyolefin resins to be used in the present invention are those which have been produced in the presence of a Ziegler type complex catalyst supported on a halogen-containing magnesium compound and have not yet been subjected to a catalyst residue-removal step.

(1) Ziegler type complex catalyst supported on a halogen-containing magnesium carrier The supported catalyst means a complex catalyst, the transition metal-compound component of which is supported on a halogen-containing compound, the complex catalyst having resulted from combining a compound of a transition metal of the IV to VIII group with an organometallic compound of a metal of the I to III group in the Mendeleev Periodic Table. By the term "as the carrier" or "supported" used herein, is meant the case where the transition metal compound is physically mounted on the halogen-containing magnesium compound as well as the case where there is a physical, physico-chemical or chemical interaction or combination between the two compounds, including the case where the halogen-containing magnesium compound takes part in the catalytic action to some extent.

Typical examples of the transition metals include titanium and vanadium. These transition metals are used in their maximum valence states or reduced states, and can be utilized in the most preferable forms for the respective metals from the standpoint of catalytic performance, such as their halides, oxyhalides, alkoxides and alkoxyhalides. These compounds are typically exemplified by titanium tetrachloride, titanium trichlorides, titanium dichlorides, tetrabutoxytitanium, tributoxytitanium chloride, dibutoxytitanium dichloride, vanadium tetrachloride, vanadium oxychloride, vanadium trichloride and the like. They can be used alone or in combination.

Typical examples of the organometallic compounds include alkylaluminium compounds, and especially trialkylaluminiums, dialkylaluminium halides, alkylaluminium dihalides, alkylaluminium sesquihalides, dialkylaluminium hydrides, alkylaluminium dihydrides and the like, wherein the alkyl group preferably has 1 to about 8 carbon atoms and the halogen is preferably chlorine, bromine or iodine. More specifically, the organometallic compounds are represented by trimethylaluminium, triethylaluminium, tri-n-propylaluminium, tri-n-butylaluminium, tri-i-butylaluminium, tri-n-hexylaluminium, tri-n-octylaluminium, diethylaluminium chloride, diethylaluminium iodide, ethylaluminium dichloride, ethylaluminium sesquichloride, diethylaluminium hydride and the like.

The halogen-containing magnesium compounds which are preferred as the carrier include magnesium dihalides, oxymagnesium halides (Mg(OH)X, X being a halogen), derivatives of oxymagnesium halides wherein the halides have been partly converted to magnesium dihalides by treating the halides with alkylaluminium dihalides such as ethylaluminium dichloride, magnesium dihalide complexes obtained by treating the dihalides with electron-donor compounds, and the like. The present invention may be less effective for some polyolefins polymerized where use as the carrier is made of an oxymagnesium halide or other magnesium compounds containing little or no halogen, but even in such cases, the resulting polyolefins can be expected to exhibit the enhanced weathering properties of the present invention when an organoaluminium compound in the polymerization catalyst contains halogen.

The following methods can be employed to cause the transition metal catalyst components to be supported on the halogen-containing magnesium compound carriers: a method of grinding both the catalyst component and the carrier by a grinding means such as a ball mill, a method of dispersing the carrier into the catalyst component when the latter is in a liquid state, as it is, or as a solution in a solvent such as hydrocarbons or halogenated hydrocarbons, a method of dissolving both compounds in a common solvent, and any other method well-known or feasible in the art.

In order to enhance catalytic performance, a variety of electron-donor compounds can be incorporated into any of the catalyst components according to a convenient method in any preparation step of the catalyst. Examples are typically disclosed in: (1) Japanese Laid-Open Patent Publication No. 16986/1973 Specification, wherein a catalyst for propylene polymerization is prepared by combining (A) a mill-ground mixture of (i) the 1:1 molecular compound obtained by reacting N,N,N',N'-tetramethylethylene diamine with titanium tetrachloride and (ii) anhydrous magnesium chloride, with (B) a reaction product obtained by reacting triethylaluminium with ethyl benzoate; and (2) Japanese Laid-Open Patent Publication No. 126590/1975 Specification, wherein a propylene polymerization catalyst is prepared by combining (A) triethylaluminium with (B) a solid catalyst component obtained by grinding both anhydrous magnesium chloride and ethyl benzoate in a ball mill, suspending the resulting ground product in titanium tetrachloride to cause titanium tetrachloride to be supported on magnesium chloride, and then treating the resulting mixture with hexane to remove unsupported titanium tetrachloride.

In the present invention, the weight ratio of the transition metal compound to the organometallic compound to the halogen-containing magnesium compound carrier is not strictly restricted, but will be generally in the range of about 1:2:2 to 1:200:50.

(2) Polyolefins

The polyolefins to be prepared in the presence of the above-mentioned catalyst and employed in the present invention include polyethylene, polypropylene, polybutene-1, poly-4-methylpentene-1 and other crystalline homopolyolefins, as well as crystalline olefin copolymers consisting of two or more olefins such as ethylene-propylene copolymers, or consisting of an olefin monomer and a copolymerizable comonomer. The polyolefins can be prepared according to any polymerization processes such as a suspension polymerization in a solvent, a suspension polymerization in a liquefied monomer, a gas-phase polymerization wherein a monomer is present in a gaseous state without dilution, and the like.

Incidentally, the crystallinity of polyolefins to be used in the present invention can be indicated in various ways. For example, the crystallinity of polypropylenes to be employed in the present invention can be conveniently represented by percentage by weight of the polyolefins insoluble in boiling n-heptane. The preferable crystalline polyolefin resins in the present invention have degrees of crystallinity represented by the insolubles in boiling heptane in the range of about 40 to about 99% by weight.

(3) Catalyst residue-removal steps

The polyolefins to be employed in the present invention are those which have been produced through polymerization over the above-mentioned catalyst and have not yet been subjected to a catalyst residue-removal step.

By the term "catalyst residue-removal step" used herein is meant a step which comprises, for the purpose of positively removing the catalyst residues contained in the polymerized polyolefins, treating the polyolefins with the compounds which can react with the catalyst residue and inactivate or solubilize the residue, such as e.g., alcohols or water and then removing the inactivated or solubilized catalyst residue by physical means such as filtration, washing and centrifuging. Thus, in the case of suspension polymerization the step of separating the resulting polymer from a dispersion medium such as a solvent or a liquefied monomer does not fall under the above-mentioned definition of the catalyst residue-removal step, although the catalyst dissolved in the dispersion medium may be removed at the separation step. The step of adding a small amount of catalyst poisons such as ethers, alcohols, ketones, esters and water to the resulting polymer, to inactivate the catalyst remaining after the completion of polymerization, or the step of treating the resulting polymer suspension with a gas such as steam or nitrogen to remove the dispersion medium also does not fall under the above-mentioned definition of the catalyst residue-removal step.

Therefore, "the crystalline polyolefins which have not yet been subjected to catalyst residue-removal steps" are those crystalline polyolefins in which substantial parts of the magnesium compounds contained in the polymerization catalysts used remain.

2. Organic Phosphorus Compounds

The organic phosphorus compounds are selected from the above-mentioned five species of compounds and mixtures thereof. These organic phosphorus compounds have a variety of molecular weights. When their molecular weights are too small, the resulting polyolefin resin compositions containing such phosphorus compounds may give rise to the contamination of the working atmosphere and the decrease in the effect of the added compounds, since such low molecular weight compounds volatilize away in the course of preparation or processing of the polyolefin resin compositions. Moreover, such compounds may cause the deterioration of quality of the molded products or decrease in their lasting effects and may also produce bad smells, since they bleed or gradually volatilize away from the molded products. It is rather difficult to define simply the preferable range of the molecular weights of the organic phosphorus compounds since it depends on the chemical structures of the compounds, the quantities of the compounds added, the species and quantities of the additives concomitantly used therewith, the molding and processing conditions of the polyolefin resin compositions, the shapes and uses of the molded articles, and other various conditions. Generally speaking, however, the preferable molecular weights of these compounds are more than about 230 and especially more than about 300.

Examples of the organic phosphorus compounds are as follows.

(1) Compounds of the formula $(R^1O)_3P$

Trimethylphosphite, tri-n-butylphosphite, tridecylphosphite, tris(2-ethylhexyl)phosphite, trinonylphosphite, tricetylphosphite, dilauryl hydrogen phosphite, tricyclohexylphosphite, triphenylphosphite, tribenzylphosphite, tricresylphosphite, tri-p-nonylphenylphosphite, diphenyldecylphosphite, tris(dinonylphenyl)phosphite, tris(2,4-di-t-butylphenyl)phosphite, tris(4-α-methylbenzylphenyl)phosphite, tris(octylthioethyl)phosphite, tris(octylthiopropyl)phosphite, tris(cresylthiopropyl)phosphite, etc., and mixtures thereof.

(2) Compounds of the formula $(R^2O)_2P-O-L-O-P(OR^2)_2$

Tetraphenyldipropyleneglycoldiphosphite, 4,4'-butylidenebis(3-methyl-6-t-butylphenyl-ditridecyl)-phosphite, which also may be named 1,1-bis{3-t-butyl-4-[bis-(tridecyloxy)phosphino-oxy]-6-methylphenyl}-butane, etc., and mixtures thereof.

(3) Compounds of the formula

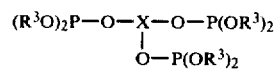

1,1,3-tris{3-t-butyl-4[bis(tridecyloxy)phosphino-oxy]-6-methylphenyl}butane, etc.

(4) Compounds of the formula

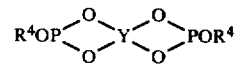

Bis(2-chloropropyl)pentaerythritoldiphosphite, bisphenylpentaerythritoldiphosphite, bisstearylpentaerythritoldiphosphite, etc.

(5) Compounds of the formula $(R^5S)_3P$

Trilauryltrithiophosphite, etc.

The quantities of the organic phosphorus compounds used are about 0.1 to about 1,000 times and preferably about 0.5 to about 100 times the quantities by weight of the halogen-containing magnesium compounds contained in the polyolefin resins from which catalyst residues have not yet been removed.

3. Preparation of the Compositions

The composition of the present invention can be obtained by incorporating the organic phosphorus compounds (together with auxiliary components if desired, the details being given below) into the polyolefin resins with the catalyst residue unremoved to produce intimate compositions, according to any method which enables these components to homogenize into an intimate composition.

The methods for preparation of the intimate compositions include, for example, a method of incorporating the required components into a polymer containing an unreactive monomer (and a dispersion medium according to the polymerization process) following the polymerization step, a method of incorporating the components into a polymer after an unreacted monomer and a dispersion medium have been removed, a method of incorporating the components into a dry polymer obtained in powder form when the polymer is being pelletized, and the like. After the incorporation, the mixture is generally blended into an intimate composition at a temperature at which the polyolefin resin can be at least partly molten.

4. Auxiliary Components

The present compositions can contain a variety of additives which are generally employed in polyolefin resins. Typical examples of such additives are as follows.

(a) Antioxidants

Phenolics such as 2,6-di-t-butyl-p-cresol, tetrakis[methylene-3-(3,5-di-t-butyl-4-hydroxyphenyl)propionate]methane, 4,4'-butylidene-bis(6-t-butyl-m-cresol), 1,1,3-tris(2-methyl-4-hydroxy-5-t-butylphenyl)-butane, 4,4'-thio-bis(2-t-butyl-m-cresol); thio-compounds such as dilauryl-thio-dipropionate, laurylstearyl-thiodipropionate, distearyl-thio-dipropionate, dimyristylthio-dipropionate; and amines such as 2,2,4-trimethyl-1,2-dihydroquinoline.

(b) Ultraviolet absorbers 2-(2'-hydroxy-3',5'-di-t-butylphenol)-5-chlorobenzotriazine, 2-hydroxy-4-n-octoxy-benzophenone.

(c) Antistatic agents

N,N'-bis(2-hydroxyethyl)-alkylamine, N,N'-bis(2-hydroxyethyl)-alkylamide, glyceryl-monostearate, and bis(pentaerythritol-distearate).

(d) Slip agents

Oleamide, stearamide, erucamide, and N,N'-ethylene-bis-stearamide.

(e) Flame retardants

Chlorinated paraffins, antimony trioxide, magnesium hydroxide, and aluminium hydroxide.

(f) Anti-blocking agents

Silicon dioxide, and calcium sulphate.

(g) Fillers

Calcium carbonate, calcium sulphate, calcium silicate, calcium hydroxide, alumina, kaolines, clays, halloysites, magnesium hydroxide, magnesium carbonate, talc, carbon black, silica, glass fibers, carbon fibers, metallic fibers, and whiskers.

(h) Pigments, etc.

When these auxiliary components are added to the present composition, the respective component exhibits its corresponding effect in the composition. It has been found that synergistic effects on the weathering properties of the polymers are obtained by combining the antioxidants and/or ultraviolet absorbers with the above-mentioned organic phosphorus compounds (I) (phosphites) through (V) (thiophosphites).

EXAMPLE 1

1. Preparation of Catalyst (1) Ten (10) grams (g) of titanium trichloride (Grade A) (50 millimoles as titanium atom) obtained by reducing titanium tetrachloride with metallic aluminium was suspended in 64 ml. of 1,2-dichloroethane. To this was added 36 ml. of iodine trichloride solution in 1,2-dichloroethane (containing 8.6 millimoles (mM) of iodine trichloride) which had been separately prepared. The mixture was stirred at a temperature of 35° to 40° C. for 3 hours to obtain a dark-purple homogeneous solution.

(2) In a nitrogen atmosphere, 20 g. of anhydrous magnesium chloride powder and 6 ml. of ethyl benzoate were placed in the pot of a vibration mill. The pot was made of a stainless steel (No. SUS 314) and had a 800-ml. volumetric capacity, in which 330 pieces of stainless steel balls (SUS 314) 12 mm in diameter were packed. The mixture was milled in the vibration mill with vibration of 4-mm amplitude and 1200/minute frequency for 24 hours without cooling, to obtain solid magnesium-containing products.

(3) In a nitrogen atmosphere, 70 ml. of 1,2-dichloroethane and 4.7 g. of the solid product obtained in step (2) were taken in a 200 ml. 3-necked flask with a Dimroth condenser. The mixture was stirred at room temperature for 30 minutes and then 30 ml. of the solution containing the titanium component (0.5 mM/ml. as titanium atom concentration) obtained in the step (1) was added thereto. The resulting mixture was heated under reflux on an oil bath, the heating being stopped 2 hours later. After the mixture were cooled to room temperature, the supernatant liquid was removed. The resulting solid was repeatedly washed with dehydrated hexane to obtain solid catalyst components. It was found that 12.7 mg. of titanium atom was supported on 1 g. of the solid material.

2. Polymerization of Propylene

Into a stainless steel autoclave of 20-liter capacity with a stirrer, were introduced 10 liters of dehydrated heptane, 190 mg. of triethylaluminum and 1,050 mg. of the solid catalyst component obtained in step (3) (corresponding to 13.3 mg. of titanium atom). Propylene was then introduced thereto to a pressure of 9 kg/cm$^2$ on gauge and polymerization was initiated at a temperature of 60° C. One hour later, propylene was discharged and the polymerization was terminated. Polypropylene cake was obtained by filtering the resulting heptane slurry containing the solid polypropylene in a nitrogen stream. After the drying resulting polypropylene was powdery and weighed 3,650 g. The boiling heptane insoluble portion of the polymer was 95% by weight. The quantity of magnesium chloride and titanium atom contained in the polymer were 270 ppm and 3.6 ppm, respectively, by weight calculated on the basis of the quantity of catalyst charged upon polymerization.

3. Pelletizing

Into 200 g. of polypropylene powder obtained in step 2, tris(nonylphenyl)phosphite was incorporated in a nitrogen atmosphere, in weight ratios of 0 (as a control), 0.1, 1, 10, 100 and 1,000 to the magnesium chloride which was considered to remain in the polypropylene, respectively. The mixtures were sufficiently blended and pelletized by means of an extruder 20 mm in diameter supplied by Thermoplastics Kogyo K.K., Japan, under the following conditions.

| | |
|---|---|
| feed zone temperature | 208° C. |
| compression zone temperature | 260° C. |
| metering zone temperature | 250° C. |
| axial rotational speed | 90 rpm |
| polymer sealing gas | nitrogen |

4. Preparation of Test Pieces for Measuring the Weathering Properties of Polymers and Measurement The pellets obtained in the step 3 were molded into sheets 0.5 mm thick by means of a hot press under the following conditions.

preheating: 230° C., low pressure, 3 minutes
heating: 230° C., 80–100 kg/cm$^2$G, 2 minutes
cooling: 30° C., 150 kg/cm$^2$G, 2 minutes From the resulting sheets, 3 test pieces 2.5 mm wide×150 mm long were cut out for each test run. These test pieces were placed in a weatherometer of sunshine type (manufactured by Suga Shikenki K.K., Japan) and treated under the conditions of rainfall period of 12 minutes/hour, to determine the time required for cracks to appear on the test pieces. The results are shown in Table 1.

EXAMPLE 2

Polymerization of propylene was carried out under the same conditions as in Example 1. The resulting polypropylene was pelletized as in Example 1 except that 4,4'-butylidene-bis(6-t-butyl-3-methylphenyl-ditridecylphosphite) a compound of the formula

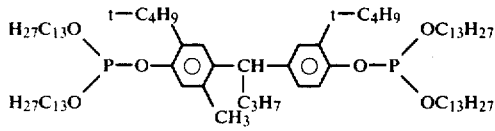

which may also be named 1,1-bis{3-t-butyl-4-[bis(-tridecyloxy)phosphino-oxy]-6-methylphenyl}butane, was incorporated instead of tris(nonylphenyl)phosphite. The weathering properties of the resulting compositions were measured, and the results are shown in Table 1.

EXAMPLE 3

Example 2 was repeated, except that 1,1,3-tris{3-t-butyl-4[bis(tridecyloxy)phosphino-oxy]-6-methylphenyl}butane methyl-4-di-tridecylphosphite-5-t-butylphenyl)butane of the formula:

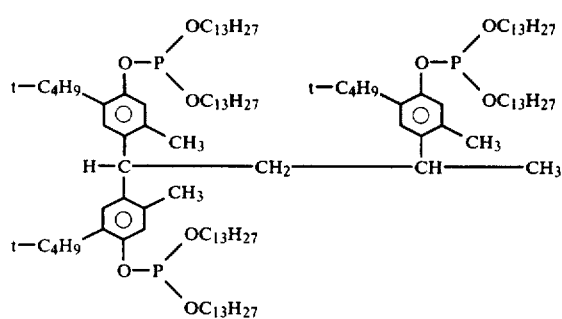

was incorporated to the polymer instead of 4,4'-butylidene-bis(6-t-butyl-3-methylphenyl-di-tridecylphosphite). The results of evaluation tests on the weathering properties of the resulting compositions are shown in Table 1.

EXAMPLE 4

Example 2 was repeated except that distearylpentaerythritol diphosphite was employed as the organic phosphorus compound instead of 4,4'-butylidene-bis(6-t-butyl-3-methylphenyl-di-tridecylphosphite). The results of evaluation tests on the weathering properties of the compositions are shown in Table 1.

EXAMPLE 5

Polypropylene was pelletized as in Example 1 except that the polymer was incorporated with tris(nonylphenyl)phosphite in the same ratios as in Example 1 (to the remaining magnesium chloride) and concomitantly with 0.1% by weight of the polymer of a phenolic antioxidant, tetrakis[methylene-3-(3,5-di-t-butyl-4-hydroxyphenyl)propionate]methane. The weathering properties of the resulting compositions were evaluated, and the results are shown in Table 1.

EXAMPLE 6

Polypropylene was pelletized as in Example 1, except that the polymer was incorporated with tris(nonylphenyl)phosphite in the same ratios as in Example 1 (to the remaining magnesium chloride) as well as 0.1% by weight of phenolic antioxidant tetrakis[methylene-3-(3,5-di-t-butyl-4-hydroxyphenyl)propionate]methane and 0.3% by weight of an ultraviolet absorber 2-(2'-hydroxy-3',5'-di-t-butylphenyl)-5-chlorobenzotriazole on the basis of the polymer. The weathering properties of the resulting compositions were evaluated and the results are given in Table 1.

TABLE 1

| | Weathering Properties of Polymers | | | | | |
| | Quantity of the phosphites added (weight ratios to magnesium chloride) | | | | | |
| Example Nos. | 0 (control) | 0.1 | 1 | 10 | 100 | 1,000 |
| --- | --- | --- | --- | --- | --- | --- |
| | (hrs) | (hrs) | (hrs) | (hrs) | (hrs) | (hrs) |
| 1 | 47 | 58 | 89 | 115 | 129 | 142 |
| 2 | 47 | 56 | 86 | 108 | 115 | 130 |
| 3 | 47 | 54 | 80 | 92 | 109 | 124 |
| 4 | 47 | 56 | 91 | 106 | 112 | 128 |
| 5 | 156 | 203 | 263 | 292 | 332 | 361 |
| 6 | 298 | 349 | 418 | 503 | 524 | 564 |

Comparative Example 1

Polymerization of propylene was carried out as in the step 2 of Example 1 except that 30 g. diethylaluminium chloride and 15 g. titanium trichloride (Grade TAC 101) manufactured by Toho Titanium K.K., Japan, were used as catalyst instead of triethylaluminium and the titanium-containing catalyst supported on magnesium chloride obtained by the step 1-(3) of Example 1. 3,230 g. of polypropylene powder was obtained. The boiling heptane insoluble portion of the resulting polymer was 96% by weight. It should be noted that the resulting polymer contains no magnesium halide. Tris(nonylphenyl)phosphite was incorporated into the polymer in the same weight ratios to the polymer as in Example 1, and the resulting compositions were pelletized. The weathering properties were evaluated, and the results are shown in Table 2.

TABLE 2

| | Weathering Properties of Polymer | | | | |
| | Quantities of the phosphite added* (to polymer, % by weight) | | | | |
| Comparative Example No. | 0 | 0.0027 | 0.027 | 0.27 | 2.7 |
| --- | --- | --- | --- | --- | --- |
| | (hrs) | (hrs) | (hrs) | (hrs) | (hrs) |
| 1 | 21 | 23 | 25 | 24 | 25 |

Note:
*The quantities of the phosphite added are shown in % by weight on the basis of the polymer, which correspond to the ratios by weight of the phosphite to the quantity of magnesium chloride as shown in Example 1. In other words, the phosphite was added in the same ratios to the polymer as in Example 1.

Comparative Example 2

A synthetic hydrotalcite represented by the formula $Mg_6Al_2(OH)_{16}CO_3.4H_2O$ was calcined in a nitrogen stream at 250° C. for 8 hours to remove water of crystallization. A titanium-containing solid catalyst component was prepared as in Example 1—1, except that the anhydrous hydrotalcite was used as the catalyst carrier instead of anhydrous magnesium chloride. It was found that 101 mg. of titanium atoms was supported on 1 g. of the solid catalyst component.

Polymerization of propylene was carried out as in Example 1 except that 1,670 mg. of the resulting solid material (168 mg. as titanium atom) as the titanium-containing catalyst component and 1,600 mg. of triethylaluminium were used. 2,980 g. of polypropylene powder was obtained. The boiling heptane insoluble portion of the polymer was 92% by weight. The polymer was incorporated with tris(nonylphenyl)phosphite under the same conditions as in Example 1, and the mixture was pelletized. The weathering properties of the resulting composition are shown in Table 3.

TABLE 3

| Comparative Example No. | Weathering Properties of Polymer |  |  |  |  |
|---|---|---|---|---|---|
|  | Quantities of the phosphite added (to hydrotalcite, weight ratio) |  |  |  |  |
|  | 0 | 0.1 | 1 | 10 | 100 |
| 2 | (hrs) 38 | (hrs) 41 | (hrs) 40 | (hrs) 43 | (hrs) 45 |

EXAMPLE 7

In Table 4 are shown the improving effects on the weathering properties afforded when the specific organic phosphorus compounds and antioxidants were concomitantly used. The preparation and method for evaluation were the same as in Example 1.

TABLE 4

| Additives | Quantity of the additives (to magnesium chloride, weight ratio) |  |  |  |  |  | Remarks |
|---|---|---|---|---|---|---|---|
|  | 0 | 0.1 | 1 | 10 | 100 | 1,000 |  |
|  | (hrs) | (hrs) | (hrs) | (hrs) | (hrs) | (hrs) |  |
| Tris(nonyl-phenyl)-phosphite (A) | 47 | 58 | 89 | 115 | 129 | 142 | Example 1 |
| RA 1010* (B) | 47 | 52 | 61 | 70 | 79 | 102 | Comparative Example |
| (A) + (B) (1:1 weight ratio) | 47 | 58 | 78 | 87 | 110 | 122 | Example 7 |

Note:
*RA1010 = Tetrakis[methylene-3-(3,5-di-t-butyl-4-hydroxylphenyl propionate]methane.

Reference Example

In Table 5 are shown the improving effects of the specific organic phosphorus compounds on heat resistance. Preparation of polypropylene and formulation were conducted in the same way as in Example 1 except that hot-pressed sheets 1 mm thick were formed, from which 3 test pieces 3 cm×5 cm were cut out for each test run.

The evaluation of the high-temperature resistance was conducted by placing the test pieces in a Geer oven and measuring the period of time required for the test pieces being partly degraded and discolored in a worm-eaten state.

TABLE 5

| Additives | High-temperature Resistance of Polymer |  |  |  |  |  |
|---|---|---|---|---|---|---|
|  | Quantity of additives (to magnesium chloride, weight ratio) |  |  |  |  |  |
|  | 0 | 0.1 | 1 | 10 | 100 | 1000 |
|  | (hrs) | (hrs) | (hrs) | (hrs) | (hrs) | (hrs) |
| Tris(nonylphenyl) phosphite (A) | 74 | 104 | 138 | 164 | 182 | 196 |
| RA 1010 (B) | 74 | 124 | 186 | 240 | 298 | 331 |
| (A) + (B) (1:1 weight ratio) | 74 | 118 | 158 | 190 | 242 | 256 |

What is claimed is:

1. A polyolefin resin composition improved in weathering properties, comprising, as an intimate admixture:
(1) a crystalline polyolefin resin which has been produced in the presence of a Ziegler type complex catalyst supported on a halogen-containing magnesium compound and has not yet been subjected to a catalyst residue-removal step; and
(2) an organic phosphorus compound in the amount of from 0.1 to 1,000 times the weight of the halogen-containing magnesium compound contained in the crystalline polyolefin resin, the organic phosphorus compound being selected from the group consisting of:

(i) a compound of the formula $(R^1O)_3P$, wherein $R^1$ is hydrogen, an alkyl group having from 1 to 20 carbon atoms, an aryl or alkaryl group having from 6 to 20 carbon atoms, an aralkyl group having from 7 to 30 carbon atoms, or hydroxy-, halo- or alkylthio-substituted derivatives thereof wherein the alkyl moiety has 1 to 30 carbon atoms, and wherein the three $R^1$ groups are the same or different;

(ii) a compound of the formula, $(R^2O)_2P—O—L—O—P(OR^2)_2$, wherein $R^2$ has the same definition as the above-mentioned $R^1$, the four $R^2$s being the same or different, and L is a divalent hydrocarbon residue having from 2 to 30 carbon atoms with or without an ether linkage contained therein;

(iii) a compound of the formula

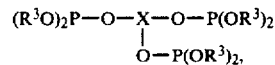

wherein $R^3$ has the same definition as the above-mentioned $R^1$, the six $R^3$s being the same or different, and X is a trivalent hydrocarbon residue having from 3 to 40 carbon atoms with or without an ether linkage contained therein;

(iv) a compound of the formula

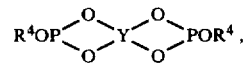

wherein $R^4$ has the same definition as the above-mentioned $R^1$, to two $R^4$s being the same or different, and Y is a tetravalent hydrocarbon residue having 5 carbon atoms;

(v) a compound of the formula $(R^5S)_3P$, wherein $R^5$ has the same definition as the above-mentioned $R^1$, the three $R^5$s being the same or different; and (vi) mixtures thereof.

2. The polyolefin resin composition as set forth in claim 1, in which the crystalline polyolefin resin is selected from crystalline homopolyolefins, crystalline olefin copolymers consisting essentially of at least two olefin monomers, and crystalline olefin copolymers consisting essentially of an olefin monomer and a monomer copolymerizable therewith.

3. The polyolefin resin composition as set forth in claim 2, in which the crystalline polyolefin resin is selected from the group consisting of polyethylene, polypropylene, polybutene-1, poly-4-methylpentene-1, and ethylene-propylene copolymers.

4. The polyolefin resin composition as set forth in claim 1, 2 or 3, in which the halogen-containing magnesium compound is selected from the group consisting of magnesium dihalides, oxymagnesium halides, derivatives of oxymagnesium halides wherein the halide has been partly converted to a magnesium dihalide by treating the halide with an alkylaluminium dihalide, and magnesium dihalide complexes obtained by treating the dihalide with an electron-donor compound.

5. The polyolefin resin composition as set forth in claim 1, 2, or 3, in which the halogen-containing magnesium compound is magnesium dichloride.

6. The polyolefin resin composition as set forth in claim 1, 2 or 3, in which the organic phosphorus compound is one having said formula $(R^1O)_3P$ and is selected from the group consisting of trimethylphosphite, tri-n-butylphosphite, tridecylphosphite, tris(2-ethylhexyl)phosphite, trinonylphosphite, tricetylphosphite, dilauryl hydrogen phosphite, tricyclohexylphosphite, triphenylphosphite, tribenzylphosphite, tricresylphosphite, tri-p-nonylphenylphosphite, diphenyldecylphosphite, tris(dinonylphenyl)phosphite, tris(2,4-di-t-butylphenyl)phosphite, tris(4-α-methylbenzylphenyl)phosphite, tris(octylthioethyl)phosphite, tris(octylthiopropyl)phosphite, tris(cresylthiopropyl)phosphite, and mixtures thereof.

7. The polyolefin resin composition as set forth in claim 1, 2 or 3, in which the organic phosphorus compound is one having said formula $(R^2O)_2P-O-L-O-P(OR^2)_2$ and is selected from the group consisting of tetraphenyldipropyleneglycoldiphosphite, 1,1-bis{3-t-butyl-4-[bis(tridecyloxy)phosphino-oxy]-6-methylphenyl}butane, and mixtures thereof.

8. The polyolefin resin composition as set forth in claim 1, 2 or 3, in which the organic phosphorus compound is one having said formula

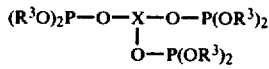

and is 1,1,3-tris{3-t-butyl-4[bis(tridecyloxy)phosphino-oxy]-6-methylphenyl}butane.

9. The polyolefin resin composition as set forth in claim 1, 2 or 3, in which the organic phosphorus compound is one having said formula

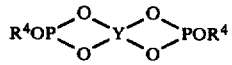

and is selected from the group consisting of bis(2-chloropropyl)pentaerythritoldiphosphite, bisphenylpentaerythritoldiphosphite, bisstearylpentaerythritoldiphosphite, and mixtures thereof.

10. The polyolefin resin composition as set forth in claim 1, 2 or 3, in which the organic phosphorus compound is one having said formula $(R^5S)_3P$ and is trilauryltrithiophosphite.

11. The polyolefin resin composition as set forth in claim 1, 2 or 3 in which the molecular weight of the organic phosphorus compound is more than about 230.

12. The polyolefin resin composition as set forth in claim 1, 2 or 3 in which the quantity of the organic phosphorus compound is about 0.5 to about 100 times the quantity by weight of the halogen-containing magnesium compound contained in the polyolefin resin.

13. The polyolefin resin composition as set forth in claim 1, 2 or 3 in which the composition further contains one or more auxiliary additives selected from antioxidants, ultraviolet absorbers, antistatic agents, slip agents, flame retardants, anti-blocking agents, fillers and pigments.

14. The polyolefin resin composition as set forth in claim 13, in which the antioxidant is selected from the group consisting of 2,6-di-t-butyl-p-cresol, tetrakis[methylene-3-(3,5-di-t-butyl-4-hydroxyphenyl)propionate]methane, 4,4'-butylidene-bis(6-t-butyl-m-cresol), 1,1,3-tris(2-methyl-4-hydroxy-5-t-butylphenyl)butane, 4,4'-thio-bis(2-t-butyl-m-cresol); dilauryl-thiodipropionate, laurylstearyl-thio-dipropionate, distearyl-thio-dipropionate, dimyristyl-thio-dipropionate; and 2,2,4-trimethyl-1,2-dihydroquinoline.

15. The polyolefin resin composition as set forth in claim 13, in which the ultraviolet absorber is selected from 2-(2'-hydroxy-3',5'-di-t-butylphenyl)-5-chlorobenzotriazole, and 2-hydroxy-4-n-octoxy-benzophenone.

16. A method for improving the weathering properties of a crystalline polyolefin resin, wherein said polyolefin resin has been prepared in the presence of a Ziegler-type complex catalyst supported on a halogen-containing magnesium compound which comprises intimately mixing said crystalline polyolefin resin, without subjecting said resin to a catalyst residue-removal step, with an organic phosphorus compound in the amount of from 0.1 to 1,000 times the weight of the halogen-containing magnesium compound contained in the crystalline polyolefin resin, the organic phosphorus compound being selected from the group consisting of:

(i) a compound of the formula $(R^1O)_3P$, wherein $R^1$ is hydrogen, an alkyl group having from 1 to 20 carbon atoms, an aryl or alkaryl group having from 6 to 20 carbon atoms, an aralkyl group having from 7 to 30 carbon atoms, or hydroxy-, halo- or alkylthio-substituted derivatives thereof wherein the alkyl moiety has 1 to 30 carbon atoms, the three $R^1$ groups being the same or different;

(ii) a compound of the formula, $(R^2O)_2P-O-L-O-P(OR^2)_2$, wherein $R^2$ has the same definition as the above-mentioned $R^1$, the four $R^2$s being the same or different, and L is a divalent hydrocarbon residue having from 2 to 30 carbon atoms with or without an ether linkage contained therein, (iii) a compound of the formula,

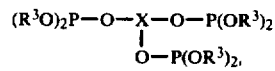

wherein $R^3$ has the same definition as the above-mentioned $R^1$, the six $R^3$s being the same or different, and X is a trivalent hydrocarbon residue having from 3 to 40 carbon atoms with or without an ether linkage contained therein;

(iv) a compound of the formula

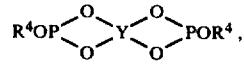

wherein $R^4$ has the same definition as the above-mentioned $R^1$, the two $R^4$s being the same or different, and Y is a tetravalent hydrocarbon residue having 5 carbon atoms;

(v) a compound of the formula $(R^5S)_3P$, wherein $R^5$ has the same definition as the above-mentioned $R^1$, the three $R^5$s being the same or different; and (vi) mixtures thereof.

* * * * *

REEXAMINATION CERTIFICATE (1883rd)

United States Patent [19]

Fujii et al.

[11] B1 4,261,880

[45] Certificate Issued   Dec. 22, 1992

[54] POLYOLEFIN RESIN COMPOSITIONS

[75] Inventors: Masaki Fujii, Yokkaichi; Akiyoshi Onishi, Tsu, both of Japan

[73] Assignee: Mitsubishi Petrochemical Company Limited, Tokyo, Japan

Reexamination Request:
No. 90/001,927, Jan. 30, 1990

Reexamination Certificate for:
Patent No.: 4,261,880
Issued: Apr. 14, 1981
Appl. No.: 963,346
Filed: Nov. 24, 1978

[30] Foreign Application Priority Data

Nov. 25, 1977 [JP] Japan ............................ 52-141235

[51] Int. Cl.⁵ ........................... C08K 5/49; C08K 5/52
[52] U.S. Cl. ................................. 524/147; 524/120; 524/128; 524/148; 524/151; 524/583; 526/125
[58] Field of Search .............. 524/120, 125, 128, 147, 524/148, 151, 583

[56] References Cited

U.S. PATENT DOCUMENTS

| | | | |
|---|---|---|---|
| 3,039,993 | 6/1962 | Friedman | 524/120 |
| 3,188,498 | 6/1965 | Gabor et al. | 524/147 |
| 3,256,237 | 6/1966 | Casey | 524/114 |
| 3,454,521 | 7/1969 | Tholstrup | 524/120 |
| 3,533,989 | 10/1970 | Wescott, Jr. | 524/151 |
| 3,558,586 | 1/1971 | Fodor | 526/139 |
| 3,636,031 | 1/1972 | Drake et al. | 524/100 |
| 3,904,565 | 9/1975 | Yoshiura et al. | 524/110 |
| 3,962,175 | 6/1976 | Hofer et al. | 524/152 |
| 3,962,203 | 6/1976 | Karayannis et al. | 528/486 |
| 3,979,370 | 9/1976 | Peters et al. | 526/348 |
| 4,029,877 | 6/1977 | Yoshiura et al. | 528/483 |
| 4,187,212 | 2/1980 | Zinke et al. | 524/101 |

FOREIGN PATENT DOCUMENTS

| | | |
|---|---|---|
| 849782 | 6/1977 | Belgium . |
| 49-80147 | 8/1974 | Japan . |
| 49-128044 | 12/1974 | Japan . |
| 50-126590 | 10/1975 | Japan . |
| 52-32985 | 3/1977 | Japan . |
| 52-115850 | 9/1977 | Japan . |
| 52-139155 | 11/1977 | Japan . |
| 803557 | 10/1958 | United Kingdom . |
| 846684 | 8/1960 | United Kingdom . |
| 1335887 | 10/1973 | United Kingdom . |

OTHER PUBLICATIONS

Sandoz Catalog "Sandostab P-EPQ 6-274/76", published by Sandoz Colors and Chemicals.
Swasey, "Improving the Processing Stability of Polyolefins", (paper given at Society of Plastics Engineers 34th Annual Technical Conference), pp. 64–67 (1976).
Journal of Chemical Industry, No. 1290, pp. 4–10.
Mitterhofer, "Recent Advances in Polymer Processing Stability" from Proceedings of the Int'l. Conf. on Polymer Processing at MIT, Cambridge, Mass., Aug. 1977, pp. 809–828.
Bailey, "Chemistry of Antioxidants, Antiozonants and Heat Stabilizers" in Weathering and Degradation of Plastics, pp. 35–48 (1966).
Catalog of Borg-Warner Chemicals Co., "Weston 618" (1977).
"Practical Handbook for Additives to Plastics and Rubbers", p. 160 (Aug. 1970).
Takagi et al., "Polypropylene Resins", pp. 146 and 148 (Oct. 1970).
Kosolapoff, *Organophosphorus Compounds*, Wiley and Sons, Inc. New York, 1950, p. 198.
Pospisil, *Degradation and Stabilization of Polymers*, vol. 1, Elsevier, New York, 1983, p. 197.

*Primary Examiner*—Kriellion S. Morgan

[57] ABSTRACT

Improvement in the weathering properties of polyolefin resins has been achieved by intimate compositions comprising Ziegler-process crystalline polyolefins containing halogen-magnesium compounds as catalytic carrier residues, and organic phosphorus compounds such as organic phosphites. The compositions may contain auxiliary components normally used in polyolefin resins; antioxidants and/or ultraviolet absorbers are especially useful.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7-10, 12, 14 and 15 is confirmed.

Claims 1-6, 11, 13 and 16 having been finally determined to be unpatentable, are cancelled.

* * * * *